June 11, 1935.    G. H. GASTON    2,004,106
SEAT OR CUSHION
Filed Nov. 17, 1932    2 Sheets-Sheet 2

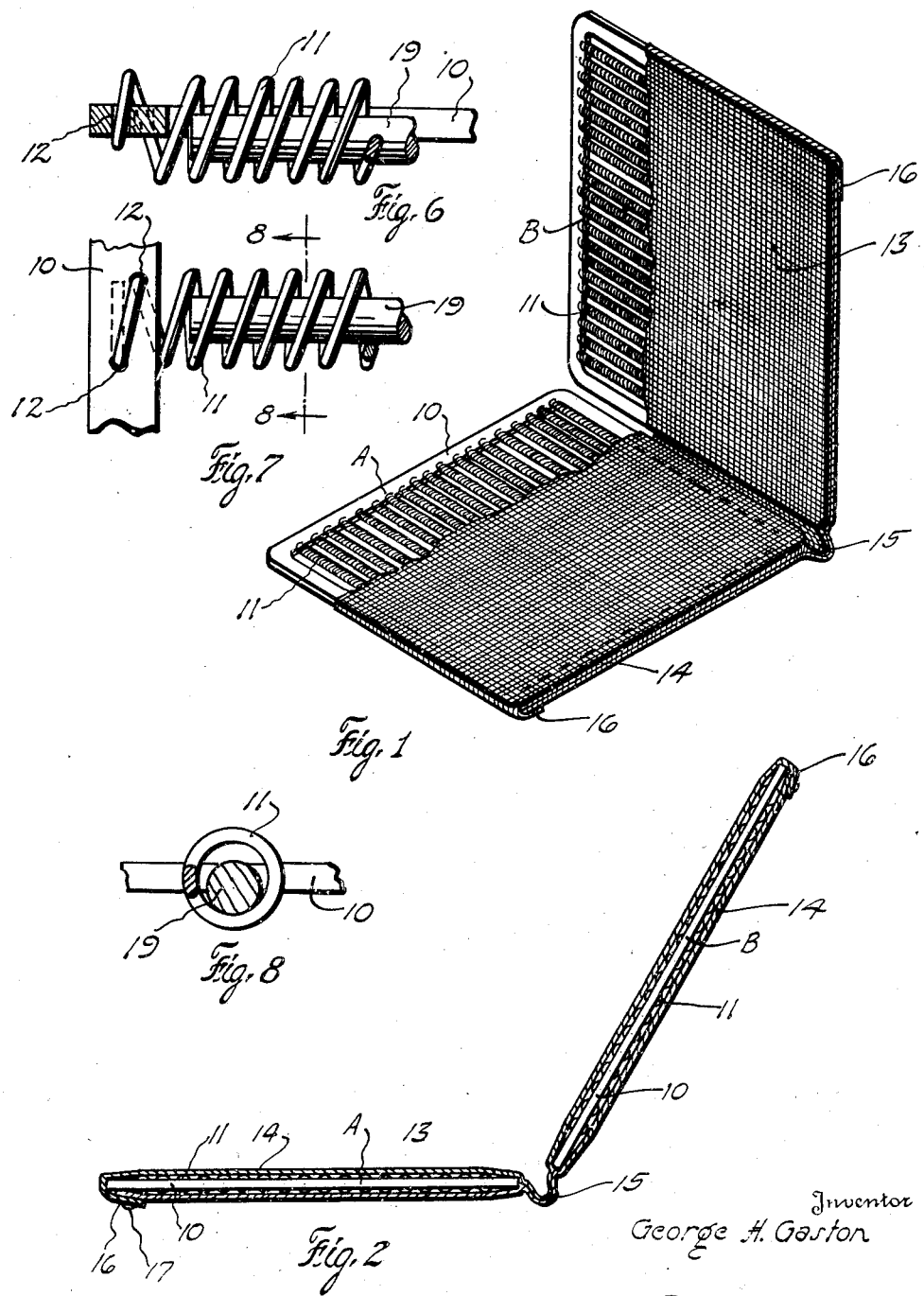

Inventor
George H. Gaston
By Jack A. Ashley
Attorney

Patented June 11, 1935

2,004,106

UNITED STATES PATENT OFFICE 2,004,106

SEAT OR CUSHION

George H. Gaston, Houston, Tex.

Application November 17, 1932, Serial No. 642,985

2 Claims. (Cl. 155—182)

This invention relates to new and useful improvements in seats or cushions.

One object of the invention is to provide an improved seat or cushion which may be applied to seats such as are used in automobiles, either as the seat proper or as a cushion for the seat; to chairs, couches and the like, as well as to mattresses.

A particular object of the invention is to provide an improved cooling and ventilating seat or cushion of simple, durable and inexpensive construction.

An important object of the invention is to provide a cushion or seat element including a frame or supporting member across which coiled springs or the like are disposed in such a manner as to provide a comfortable and useful seat, particularly when supported on an underlying yieldable member, such as a cushioned seat, mattress or the like.

A further object of the invention is to provide a seat element in which moisture absorbing wicks or members are placed in the spring coils, whereby a self-cooling seat or cushion is provided.

Another object of the invention is to provide a cushion or seat element including spring coils disposed side by side and so related as to permit a rolling motion, whereby the body of the person sitting on the springs will undergo a forward and backward movement when the coils are arranged transversely to the line of movement of a vehicle.

Still another object of the invention is to provide a seat or cushion for use on the seats of motor vehicles and including a seat member and a back member, each including a support and a plurality of spring coils disposed transversely with respect to the body of the occupant and placed side by side, whereby the body of said occupant is properly and comfortably supported and cooled.

A further object of the invention is to provide a seat or cushion including a frame having spring coils thereacross and enclosed in a covering envelope of fabric, or other suitable material, slipped over the frame and unattached to the coils, whereby the coils are each free to flex or roll.

A particular object of the invention is to provide a seat or cushion for a motor vehicle arranged to project forwardly and overhang the front of the vehicle seat, so that air currents passing upwardly from the floor are arrested and diverted into the cushion.

A construction designed to carry out the invention will be hereinafter described, together with other features of the invention.

Figure 3:
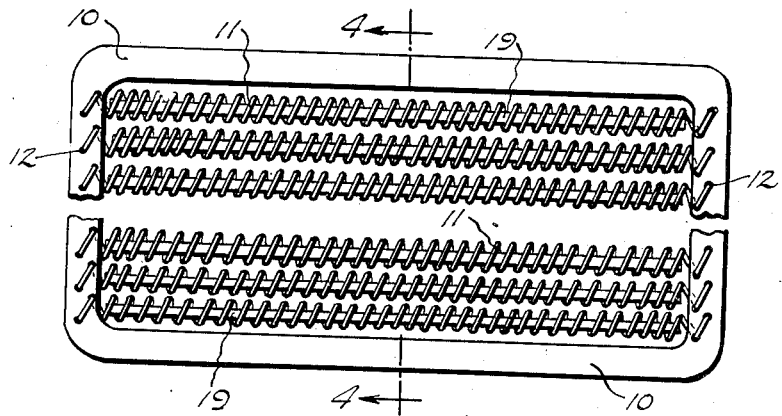
Figure 4:
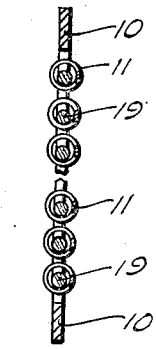
Figure 5:
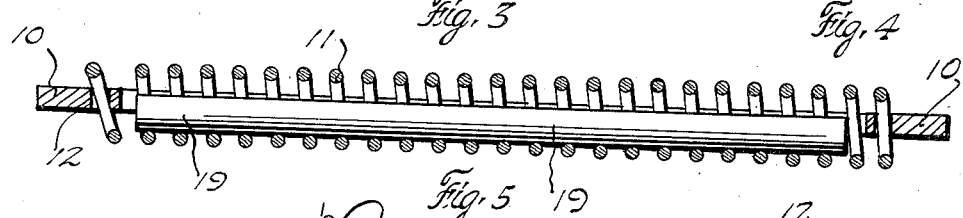
Figure 10:
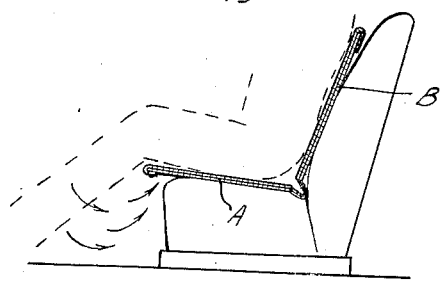
Figure 9:
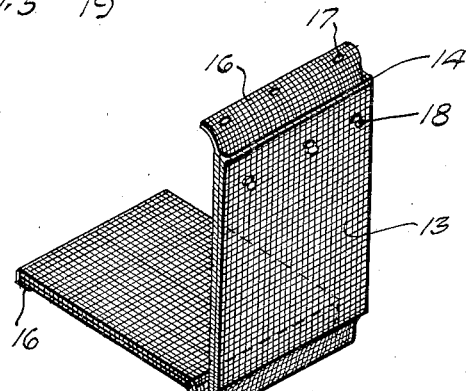
Figure 11:
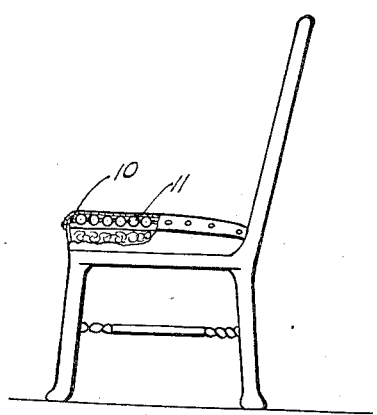
Figure 12:
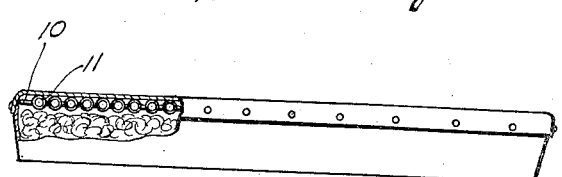

The invention will be more readily understood from a reading of the following specification and by reference to the accompanying drawings in which an example of the invention is shown, and wherein:

Figure 1 is a perspective view showing a cushion or auxiliary seat constructed in accordance with the invention, portions of the covers being broken away to show the cushioning elements, Figure 2 is a longitudinal sectional view of the same, Figure 3 is an enlarged detail of one of the cushion elements, Figure 4 is a cross-sectional view taken on the line 4—4 of Figure 3, Figure 5 is an enlarged longitudinal sectional view taken through one of the coils and its frame, Figures 6 and 7 are details of the coil mounting, Figure 8 is a cross-sectional view taken on the line 8—8 of Figure 7, Figure 9 is a perspective view showing the covering with one of its closures opened, Figure 10 is a side view showing the cushion in position on a motor vehicle seat, Figure 11 is a sectional view showing a seat constructed in accordance with the invention, and Figure 12 is a sectional view of a mattress constructed in accordance with the invention.

In the drawings the numeral 10 designates a rectangular metal frame or support. This frame is preferably made flat with rounded corners, but the invention is not to be limited to any particular size, shape or material, so long as the support serves the purpose. In most applications of the invention the frame will be rectangular, but it may be square.

Spring coils 11 are disposed within and across the frame and are shown as arranged transversely rather than longitudinally thereof. The coils may be formed of any suitable material but I prefer to form them of wire which is rust-proof and capable of considerable flexibility without losing the shape into which it is formed. The frame should also be rust-proof. While the ends of the coils may be connected to or attached to the frame in any suitable manner, I have found a very simple expedient in passing the end of the coil wire through a pair of offset holes 12 in the frame and bending the end of the wire to rest against the underside of the frame, as is best shown in Figures 5 to 8, inclusive.

Usually the coils are only tensioned sufficiently to prevent sagging, but if desired all or part of the coils may be extended and thus tensioned when placed in the frame. The convolutions or turns of each coil are normally spaced apart sufficiently to prevent them from pinching the body of the occupant. The coils are shown side by side or parallel and each coil is spaced from those on each side of it. This arrangement permits each coil to act independently, as well as moving to a limited extent, independently of the adjacent coils.

The frame and coils constitute a cushion unit which may be utilized in a number of ways. In Figures 1, 2, 9 and 10, I have shown the unit forming part of an automobile seat cushion. Two units A and B are provided, the unit A for the seat and the unit B for the back of the seat. A cover 13 of suitable fabric, or other material, is used. The cover shown includes a pair of pockets or envelopes 14 connected by a hinge 15 formed by sewing the top and bottom sheets of fabric together.

Each pocket 14 has a flap 16 extending across its outer open end, arranged to be folded under the cover. Fastening sockets 17 along the edge of the flap are engaged on resilient studs 18 on the under side of said pocket to fasten the flap. This style of cover has been found to be convenient and easily applied and removed, but any suitable cover may be used. It is desirable that the cover be unattached to the coils or secured between the coils, thus leaving the latter entirely free.

When the cushion is placed on an automobile seat, as is shown in Figure 10, it is desirable to have the unit A of such length as to project over the front edge of the automobile seat. The covering 14 is preferably made of coarse open mesh fabric when the invention is applied to an automobile cushion. The air currents sweeping up from the floor of the automobile will strike the underside of the projecting portion of the seat unit of the cushion, whereby the air currents will be deflected into the unit A and pass rearwardly through the coils. The body and limbs of the occupant resting upon the seat portion of the cushion will aid in deflecting the currents rearwardly and by such action will be cooled.

The body of the occupant resting upon the coils 11 and the latter being free and spaced apart, it is obvious that said coils may roll and thus the body of the occupant may undergo a slight forward and backward movement due to the rolling motion of said coils. This has been found to be restful and to relieve fatigue in driving. The coils extending across the frame and arranged side by side, have been found to give more uniformly and to conform to the contour of the body and limbs, thereby providing a more comfortable seat. This has been found particularly true when compared with a spiral spring coil, such as is shown in my former Patent No. 1,593,066. It has also been ascertained that arranging the coils side by side gives a better ventilating structure than can be obtained with a spiral or circular arrangement. The cover 14 could be made of close mesh fabric if the ventilating or air circulation was not desirable.

By using a rectangular or angular frame and arranging the coils crosswise, each unit may be made longer without changing the width, which is very desirable, and which is not possible where a spiral coil is employed. This is particularly true of the back unit B, which may be made long enough to extend sufficiently high on the back of the seat to support the shoulders of the occupant. The structure illustrated keeps the clothing of the occupant out of contact with the seat and back of the vehicle and eliminates the frictional contact which would otherwise result. The springs being free to flex and roll, it is obvious that movements of the body of the occupant are compensated and a floating effect given, which is highly desirable.

It is within the scope of the invention to provide cooling means for the cushion or seat, and this is carried out by inserting cylindrical wicks or bars 19 or similar elements of absorbent or moisture exuding material, such as felt, or fabric, or the like, into the coils 11. It is preferable to make these wicks shorter and smaller than the coils so that when they are moistened and swell they will not protrude between the turns of the coils or buckle between the sides of the frame. To moisten the units, and as an illustration, the flap 16 is unfastened and the unit A is removed from its pocket 14 and immersed in water. The wicks will absorb water and the unit may then be removed, held in an upright position to drain and the surplus moisture then wiped off. The unit is next replaced in the pocket 14 and the flap 16 fastened. It has been found that the wicks will not exude surplus water and if the unit is carefully wiped before placing in the pocket, the fabric will not become wet and make the clothes of the occupant damp. As a precautionary step, the unit may be suspended and permitted to thoroughly drain before being wiped, but under most conditions this will not be necessary.

The moist wicks within the coils will cool the air currents by evaporation and a very cool and comfortable cushion will be provided. The wicks, when moistened, and when made of the proper size so as not to be compressed within the coils, will not discharge or exude moisture upon flexing of said coils and this is particularly true where the coils are placed transversely across the frame rather than vertically or from front to rear. Where the coils, and consequently the wicks, are placed vertically there is a tendency for the water contained in the wicks to run down and discharge from the coils, thereby wetting the cover, so it is not desirable when using the wicks to arrange the coils vertically; but the invention is not to be limited to a transverse arrangement of the coils, particularly if the wicks are not used.

In my former patent, above referred to, wicks were used in a spiral coil, but this was found to be unsatisfactory because the spirals interfered with the circulation of the air currents and cut off much of the air space. Also in my former patent, the spirals of the coils were in contact and there was no opportunity for the coils or spirals to move individually or for air to pass therebetween. I further found that much superior results were had where the wick was made of a less diameter than the internal diameter of the coil, as is shown in Figure 8, and as has before been referred to.

While the invention is highly suited to use in an automabile cushion, it could of course be inserted into the ordinary seat cushion of an automobile, chair, or any other seat, as is shown in Figure 11. The upholstery or covering of the seat might be provided with a flap similar to the flap 16 where it was desired to remove the unit. The unit, when so inserted, will make for comfort and will permit a circulation of air where the upholstery covering is of open mesh texture or air is otherwise admitted to the seat.

In Figure 12 the unit is shown inserted in a mattress and it is obvious that the coils would conform to the body of one lying upon said mattress, thereby inducing rest as well as making for a lower temperature.

The description which has been given recites more or less detail of a particular embodiment of the invention, which is set forth as new and useful, however, I desire it understood that the invention is not limited to such exact details of construction, because it is manifest that changes and modifications may be made within the scope of the appended claims, without departing from the spirit of the invention.

What I claim and desire to secure by Letters Patent, is:

1. A portable cushion comprising, a flexible rectangular frame adapted to yield when sat upon, a plurality of spring coils disposed side by side within and across said frame, the convolutions of the coils being closely spaced and the coils being in such juxtaposition as to form a continuous seat, said coils extending above and below the frame, whereby said frame is supported above the surface on which the coils are rested, absorbent wicks disposed longitudinally in said coils, the frame closing the ends of the coils whereby the wicks are retained therein, and a removable fabric casing covering the frame and coils.

2. A portable cushion comprising, a flexible frame adapted to yield when sat upon, a plurality of horizontally extending coil springs disposed within and across said frame, the said coil springs being closely spaced in side by side relation so as to form a continuous seating surface, said springs being of such diameters as to project above and below the frame to support the latter above the surface on which the cushion is rested and also whereby said frame and springs may be inverted, the coil springs being connected at their ends to the sides of the frame and being free from connection intermediate their ends, whereby each coil spring may roll independently of the other springs, and a removable fabric casing covering the frame and coil springs.

GEORGE H. GASTON.